(12) United States Patent
Mizukami et al.

(10) Patent No.: US 8,176,619 B2
(45) Date of Patent: May 15, 2012

(54) METHOD OF MANUFACTURING MOLDED COMMUTATOR

(75) Inventors: Hirofumi Mizukami, Fukui (JP); Noriteru Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 275 days.

(21) Appl. No.: 12/067,132

(22) PCT Filed: Oct. 12, 2007

(86) PCT No.: PCT/JP2007/069917
§ 371 (c)(1),
(2), (4) Date: Mar. 17, 2008

(87) PCT Pub. No.: WO2008/047696
PCT Pub. Date: Apr. 24, 2008

(65) Prior Publication Data
US 2010/0084943 A1    Apr. 8, 2010

(30) Foreign Application Priority Data
Oct. 17, 2006    (JP) .................................. 2006-282419

(51) Int. Cl.
*H01R 43/06* (2006.01)
*H01R 43/10* (2006.01)
(52) U.S. Cl. ........................................... 29/597; 29/598
(58) Field of Classification Search .......... 310/220–222, 310/224–226, 233–235; 29/597, 56.5, 598, 29/733, 738
See application file for complete search history.

(56) References Cited

U.S. PATENT DOCUMENTS

| | | | | |
|---|---|---|---|---|
| 2,651,834 A | * | 9/1953 | Klym | 29/597 |
| 4,316,171 A | * | 2/1982 | Miyabayashi et al. | 338/21 |
| 4,760,301 A | * | 7/1988 | Iizima et al. | 310/233 |
| 2005/0016969 A1 | * | 1/2005 | Kessler et al. | 219/121.6 |

FOREIGN PATENT DOCUMENTS

| | | |
|---|---|---|
| CN | 1088281 | 7/2002 |
| JP | 56-10048 | 2/1981 |
| JP | S62-088459 U * | 6/1987 |
| JP | 64-31360 | 2/1989 |

(Continued)

OTHER PUBLICATIONS

Inuzuka et al., JP 08237913A Machine Translation, Sep. 13, 1996.*

(Continued)

*Primary Examiner* — Thiem Phan
(74) *Attorney, Agent, or Firm* — Wenderoth, Lind & Ponack, L.L.P.

(57) ABSTRACT

A method of manufacturing a molded commutator for a vacuum cleaner motor, includes providing a cylindrical molding ring; arranging commutator segments in a circle along an inner periphery of the cylindrical molding ring such that grooves are formed between adjacent pairs of the commutator segments and the grooves are extended orthogonal to the rotating direction; press-fitting cylindrical varistors between the commutator segments, with a press-fitting load for each of the varistors ranging from 2 kN to 5 kN; and resin-molding the commutator segments and the varistors together with a molding material so as to maintain integral engagement of the commutator segments and the varistors; wherein the commutator segments are of copper alloy containing silver, and the varistors are of zinc oxide compounds; wherein side surfaces of the varistors contact with the adjacent pairs of commutator segments; and flexible metal is printed on the contacting side surfaces of the varistors.

6 Claims, 9 Drawing Sheets

FOREIGN PATENT DOCUMENTS

| | | |
|---|---|---|
| JP | 2-151243 | 6/1990 |
| JP | 3-6804 | 1/1991 |
| JP | 3-93443 | 4/1991 |
| JP | 6-204006 | 7/1994 |
| JP | 8-237913 | 9/1996 |
| JP | 10257739 A * | 9/1998 |
| JP | 10-336984 | 12/1998 |
| JP | 2002-171724 | 6/2002 |
| JP | 2003-297613 | 10/2003 |
| JP | 2005-129651 | 5/2005 |

OTHER PUBLICATIONS

Ueno et al., JP 10257739A Machine Translation, Sep. 25, 1998.*
English translation of JP 2005-129651, May 2005.
English translation of JP 8-237913, Sep. 1996.

* cited by examiner rotating direction

METHOD OF MANUFACTURING MOLDED COMMUTATOR

This application is a U.S. national phase application of PCT International Application PCT/JP2007/069917, filed Oct. 12, 2007.

BACKGROUND OF THE INVENTION

1. Technical Field

The present invention relates to a molded commutator of a motor used for a cleaner and a power tool, and also relates to a method of manufacturing the molded commutator.

2. Background Art

In a motor employed for a domestic vacuum cleaner, because of its rotation at a high speed, each of the commutator segments of a molded commutator undergoes a centrifugal force, by which a step is formed on the surface of the molded commutator. A large step can accelerate mechanical wear of a brush or cause unwanted spark discharge (hereinafter referred to as "spark") between the brush and the commutator segments. It is therefore important that such a step should be as small as possible. To address the problem above, for example, Japanese Examined Patent Application Publication No. H05-38544 introduces a molded commutator where column-shaped ceramic is provided between the commutator segments to decrease the step to as small as several micrometers.

On the other hand, in a low-voltage DC motor used for information equipment, a varistor is externally disposed between the commutator segments. When voltage exceeds a predetermined level, the varistor has a steep decrease in resistance values to increase current flow. The characteristics of the varistor suppress spark voltage between the commutator segments, contributing to an extended operating life of the brush and a noise-reduced motor. For example, Japanese Unexamined Patent Application Publication No. H06-204006 discloses a method of manufacturing a zinc-oxide varistor suitable for low-voltage driving.

The molded commutator used for the low-voltage DC motor above, however, has many commutator segments; fixing varistors between the commutator segments is time-consuming work. Besides, the varistors should be protected from the centrifugal force generated by rotation of the motor. Furthermore, in a motor used for a vacuum cleaner, high voltage is applied between the commutator segments; a varistor having a low varistor voltage cannot be used in such a motor.

SUMMARY OF THE INVENTION

The molded commutator of the present invention has a plurality of commutator segments each of which has a groove in both sides; a plurality of cylindrical varistors each of which is fitted in a groove between the adjacent commutator segments; and a molding material for molding the commutator segments and the varistors to keep the integral engagement of them.

The structure above minimizes formation of the step on the surface of the molded commutator. At the same time, the varistors in the structure suppress spark voltage between the commutator segments, which increases the operating life of a brush and strength of the molded commutator.

DETAILED DESCRIPTION OF THE PREFERRED EMBODIMENTS

The molded commutator of the present invention will be described with reference to the accompanying drawings.

Figure 1:
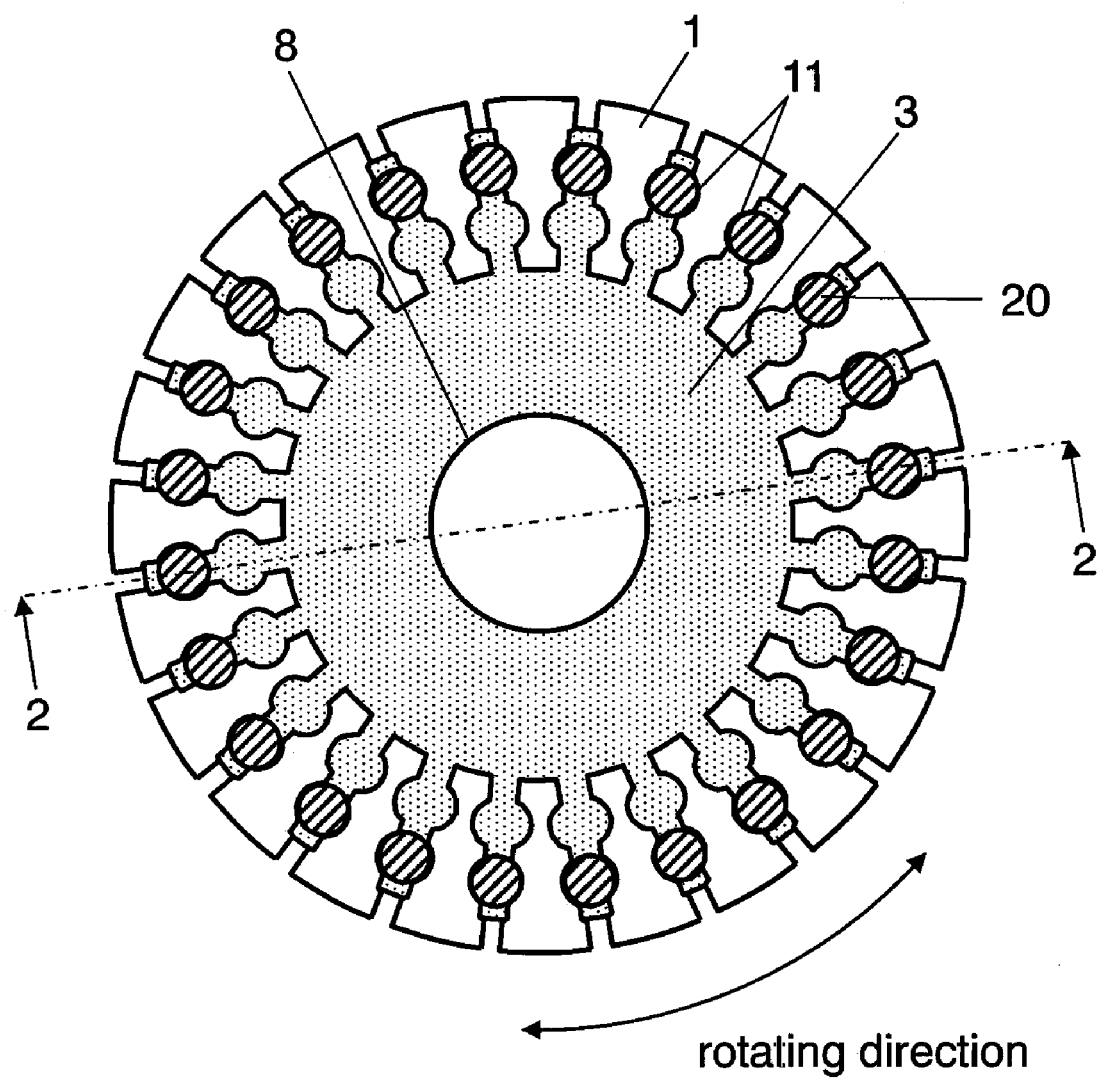
FIG. 1 is a sectional view perpendicular to a rotation shaft of a molded commutator in accordance with an exemplary embodiment of the present invention.
Figure 2:
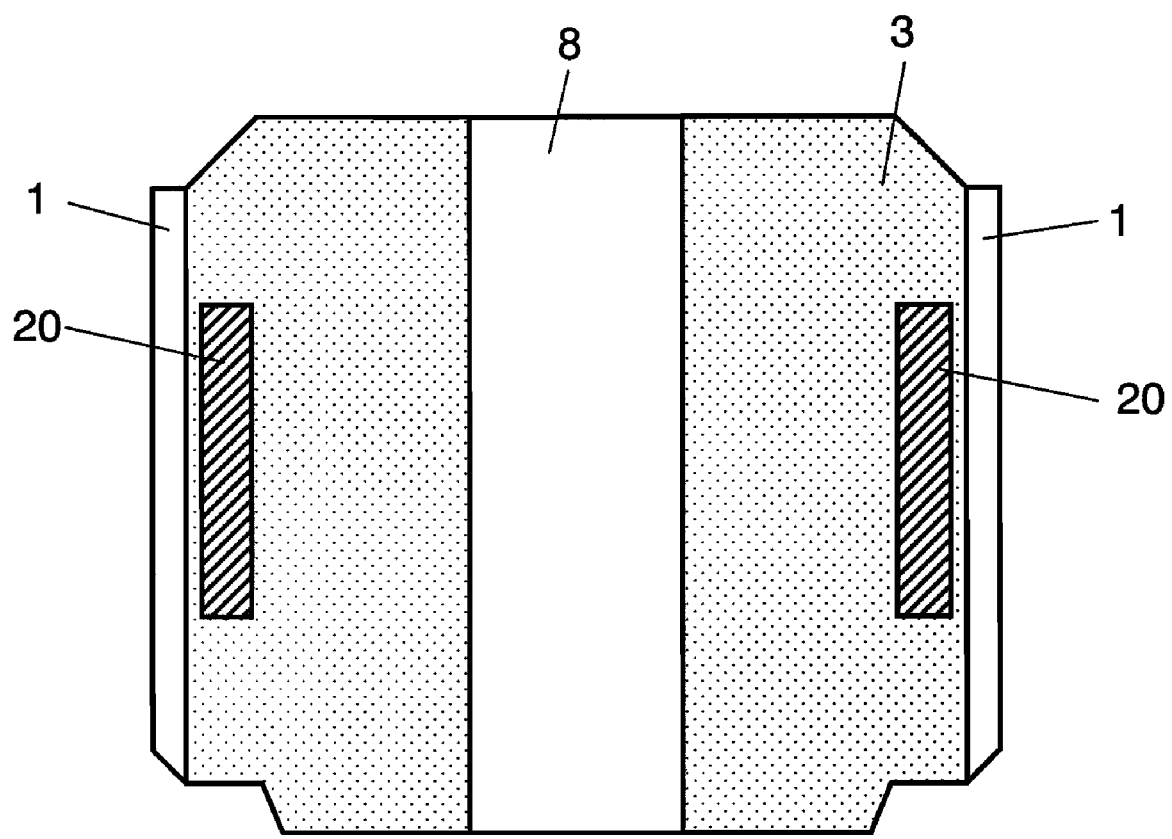
FIG. 2 is a sectional view taken along line 2-2 of FIG. 1.
Figure 3:
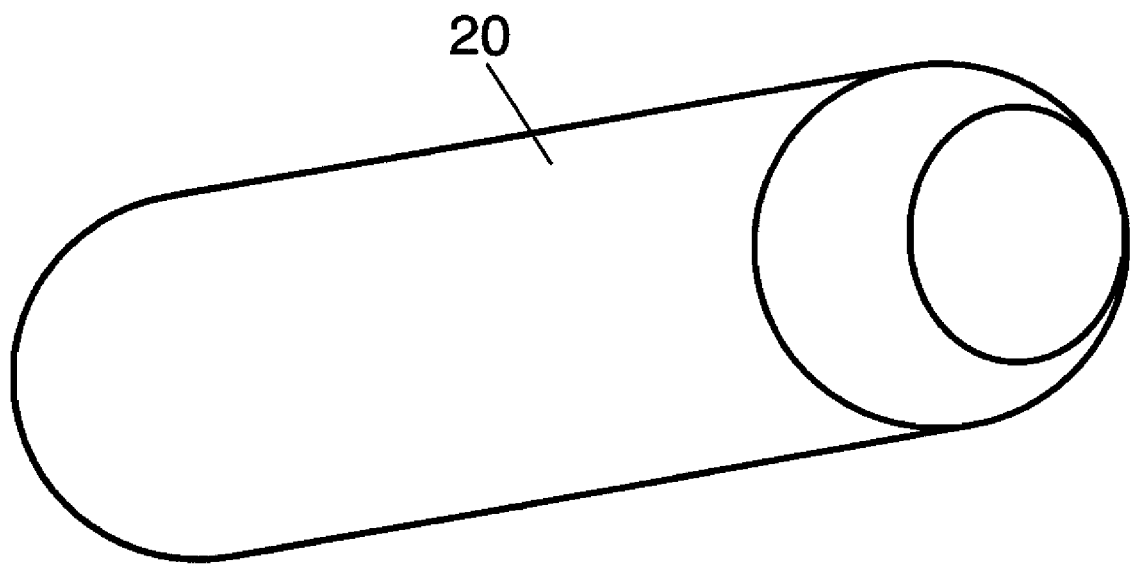
FIG. 3 is a perspective view of a varistor in accordance with the exemplary embodiment.

FIG. 1 is a sectional view perpendicular (orthogonal) to the rotation shaft of a molded commutator in accordance with an exemplary embodiment of the present invention. FIG. 2 is a sectional view taken along line 2-2 of FIG. 1. FIG. 3 is a perspective view of a varistor in accordance with the exemplary embodiment.

The molded commutator, as shown in FIGS. 1 and 2, has a plurality of commutator segments 1, a plurality of cylindrical varistors (hereinafter referred to as "varistor pin") 20, and molding material 3 for molding commutator segments 1 and varistor pins 20 as an integral structure. Molding material 3 has hole 8 for the rotation shaft (not shown) at the center. Inserted through hole 8, the rotation shaft rotates a component to be rotated.

Commutator segments 1 are made of copper alloy containing silver that constitutes approx. 0.05%, by weight, of electrolytic copper with high conductivity. Each of commutator segments 1 has groove 11 on both sides in the rotating direction indicated by the double-headed arrow (FIG. 1). Each of grooves 11 extends along the direction of the rotation shaft (i.e., in the direction perpendicular to the sectional view of FIG. 1; orthogonal to the rotation direction). To form grooves 11 in commutator segments 1, a hoop of copper alloy is continuously processed by variously shaped die-cutting. Commutator segments 1 with grooves 11 above are processed, by press working, into a finally intended shape. In the process, as required, a flexible metal, such as tin, nickel, gold and silver, is plated on the surface of commutator segments 1. The flexibility of the metal allows engagement of commutator segments 1 and varistor pins 20 with stable contact.

Varistor pins 20, as shown in FIGS. 1 through 3, are formed into a cylindrical shape so as to fit with the shape of grooves 11 of commutator segments 1. Varistor pins 20—a detailed description thereof will be given below—are made of a mixture of zinc oxide powder with the following oxides: bismuth oxide, cobalt oxide, nickel oxide, manganese oxide, chrome oxide, aluminum oxide, silicon oxide, tin oxide, antimony oxide. Such formed varistor pins 20 have a predetermined varistor voltage. In the process, a flexible metal, such as tin, nickel, silver and gold, is provided at least on a surface of varistor pins 20 that makes contact with commutator segments 1 by printing or the like, as required. This provides enhanced stable contact between varistor pins 20 and commutator segments 1.

Molding material 3 is formed of, for example, phenol resin to which glass fiber or inorganic filler are added.

The molded commutator of the present invention has the varistor pins between the commutator segments. The varistor pins are made of zinc oxide-based compound and formed by extrusion molding and baking. Besides, varistor voltage of the varistor pins is determined to be higher than the voltage between the commutator segments. Therefore, when the molded commutator carries a current of 1 mA, varistor voltage Av between the commutator segments is determined to satisfy the following condition: varistor voltage Av>motor supplied voltage/(the number of commutator segments/2). That is, the motor supplied voltage is applied between the first brush (that makes contact with a point of the commutator) and the second brush (that makes contact with a point opposite to the point above); voltage applied between the commutator segments is represented by the expression: motor supplied voltage/(the number of commutator segments/2).

Varistor characteristics of the varistor pins are represented by expression 1 below:

$$I=KV^\alpha \qquad \text{expression 1,}$$

(where, I represents the current applied to the varistor pin; K represents the varistor constant; V represents varistor voltage; and $\alpha$ represents the nonlinear resistance index.)

The varistor pin of the molded commutator of the present invention need to have a predetermined varistor voltage and a high nonlinear resistance index as varistor characteristics. Here will be a specific description of the varistor characteristics.

The predetermined varistor voltage above is the voltage measured when a current of 1 mA flows through the varistor pin and is determined by voltage applied between the commutator segments and the distance between the commutator segments. For example, suppose that the voltage between the commutator segments measures 30V and the distance between the commutator segments measures 0.5 mm. In this case, varistor voltage needs to be 60V/mm or greater in thickness.

In a practical use, there are some points to be considered regarding safety factor; spark voltage that occurs between the commutator segments is more than two times as high as the voltage applied between the commutator segments. Besides, in consideration of variations in voltage and in distance of the commutator segments in the manufacturing process, the varistor voltage should be determined. Specifically, when a 24-pole commutator carries 240V AC, the varistor voltage measures 56V/0.8 mm (as an actual distance between the commutator segments). Therefore, in a practical use, a varistor pin with a varistor voltage ranging from 70V/mm to 80V/mm should preferably be employed.

Next will be described nonlinear resistance index $\alpha$. A higher value of index a stabilizes current (i.e., spark current) that passes through a varistor pin; the varistor pin should preferably be formed of material with a higher value of index $\alpha$. For example, a strontium titanate-based varistor has a $\alpha$ value ranging from 2 to 10. In contrast, a zinc oxide-based varistor has a $\alpha$ value ranging from 20 to 60. A zinc oxide-based material is remarkably effective in suppressing spark voltage.

For the reason above, the varistor pin of the exemplary embodiment is made of a zinc-oxide compound. The zinc-oxide compound is a mixture of zinc oxide powder with the following oxides: bismuth oxide, cobalt oxide, nickel oxide, manganese oxide, titanium oxide, chrome oxide, aluminum oxide, silicon oxide, tin oxide, antimony oxide.

The varistor pin of the exemplary embodiment is manufactured through the processes below.

preparing a zinc oxide-based powder with an average diameter of 0.6 μm to 3 μm inclusive;

adding polyvinyl alcohol as a binder to the powder to obtain a formable mixture; and processing the mixture by extrusion molding while well mixing under vacuum and cutting them into a predetermined length and baking them, where the baking process has the following conditions:

baking temperature: 900° C.-1300° C. (inclusive)

baking period: 10 hrs-30 hrs (inclusive)

rate of temperature increase: 25° C./hr-50° C./hr (inclusive)

In general, to obtain a cylindrical varistor pin so as to fit with both sides of the commutator segment (in the rotating direction), the diameter of the varistor pin should range from approx. 1 mm to 2 mm, and the length should range from approx. 5 mm to 15 mm. Therefore, a press-molding method—where a cylindrical varistor pin is manufactured as a molded product with the use of a press tool—has great difficulty in terms of molding accuracy and productivity.

In contrast, the method of the exemplary embodiment, in which a zinc-oxide compound and a binder are mixed up under vacuum and the mixture is formed as an extruded product at high pressure, can continuously produce the varistor pins with high dimensional accuracy, increasing productivity. Mixing of the zinc oxide compound in a high density with the binder and extruding the mixture at a proper pressure allow the varistor pin after baking to have a density ranging from 5 g/cm$^3$ to 5.5 g/cm$^3$ inclusive. Such a mixture with a high density prevents the product from having impurities and voids, providing a reliable varistor pin.

Varistor voltage of a varistor pin depends on the number of grain boundaries. Therefore, determining a proper number of grain boundaries is important for providing a varistor pin having an intended varistor voltage.

In a low-voltage range, the grain boundary serves as a resistor and blocks the movement of electrons; no current flows. On the other hand, in a high-voltage range, the tunnel effect allows electrons to go over the grain boundary and therefore current flows. In a zinc oxide-based varistor, it is generally believed that the varistor voltage between two grain boundaries measures approx. 2V.

Therefore, when a varistor has a varistor voltage of 50V/mm, the varistor has about 25 grain boundaries/mm; similarly, when a varistor has a varistor voltage of 350V/mm, the varistor has about 175 grain boundaries/mm.

A predetermined varistor voltage can be controlled by controlling the baking temperature and baking period; when the mixture is baked at higher temperature for a longer period, the diameter of a crystal grain of zinc oxide increases, and accordingly, the number of grain boundaries decreases. Such structured varistor pin has a low varistor-voltage. Selecting zinc-oxide powders with larger grain-diameter prior to baking also contributes to manufacturing of a varistor pin with a low varistor-voltage.

When the zinc-oxide compound powder has a low density to the binder in the mixture, it is difficult to sinter particles in the mixture, such that the number of particles per unit length is increased. In this case, the varistor pin as a product has a high varistor-voltage.

On the other hand, when the zinc-oxide compound powder has a high density to the binder in the mixture, the particles in the mixture are easily sintered, whereby the number of particles per unit length is decreased. In this case, the varistor pin as a product has a low varistor-voltage.

A motor with a commutator, which is used for a cleaner and a power tool, generally operates on 100V-240V AC. Under the operating environment, a voltage of 10V-50V is applied between the commutator segments with a distance of 0.2 mm-1.0 mm. Therefore, the varistor voltage required for the varistor pin should range from 10V/mm to 250V/mm inclusive.

In a practical use, however, there are some points to be considered regarding safety factors; spark voltage that occurs between the commutator segments is more than two times as high as the voltage applied between the commutator segments. Besides, in consideration of variations in voltage and in distance of the commutator segments in the manufacturing process, the varistor voltage should preferably be determined from 20V/mm to 500V/mm inclusive.

As described above, selecting a proper grain diameter of the zinc-oxide compound or determining a proper varistor voltage allows varistor pin 20 to be suitable for each of various molded commutators.

The molded commutator of the exemplary embodiment of the present invention has an improved structure in which the varistor pins are held between the adjacent commutator segments. The structure suppresses sparks and increases the operating life of the brush of the motor, and at the same time, the structure enhances mechanical strength of the molded commutator.

Besides, the manufacturing method of the exemplary embodiment of the present invention produces a varistor pin having a predetermined varistor voltage. Such structured varistor pin protects itself from degradation of characteristics and breakdown, and at the same time, suppresses sparks effectively.

Hereinafter, a method of manufacturing the molded commutator of the exemplary embodiment will be described with reference to FIGS. 4 through 7.

Figure 4:
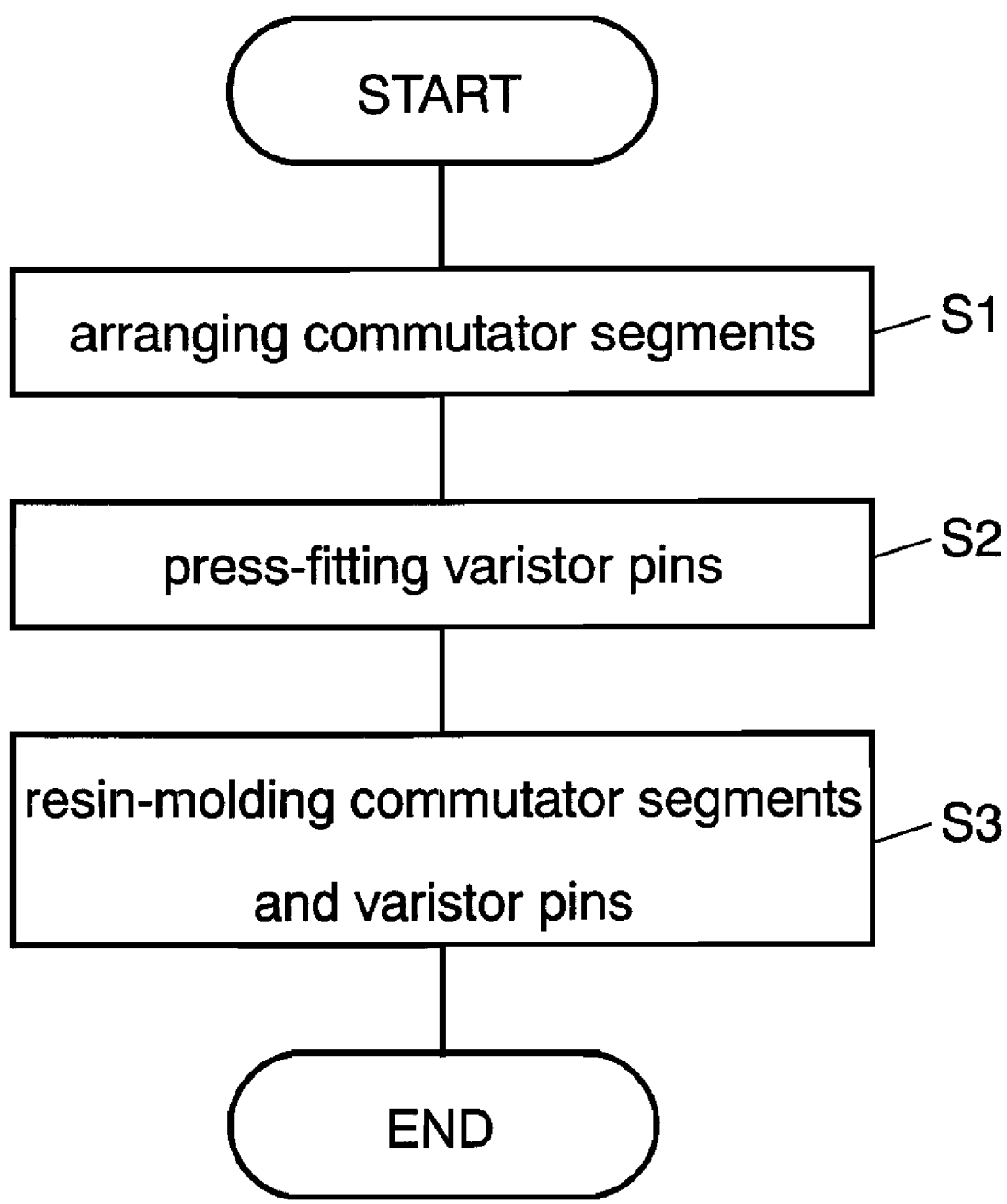
FIG. 4 is a flow chart showing a method of manufacturing the molded commutator of the exemplary embodiment.
Figure 5:
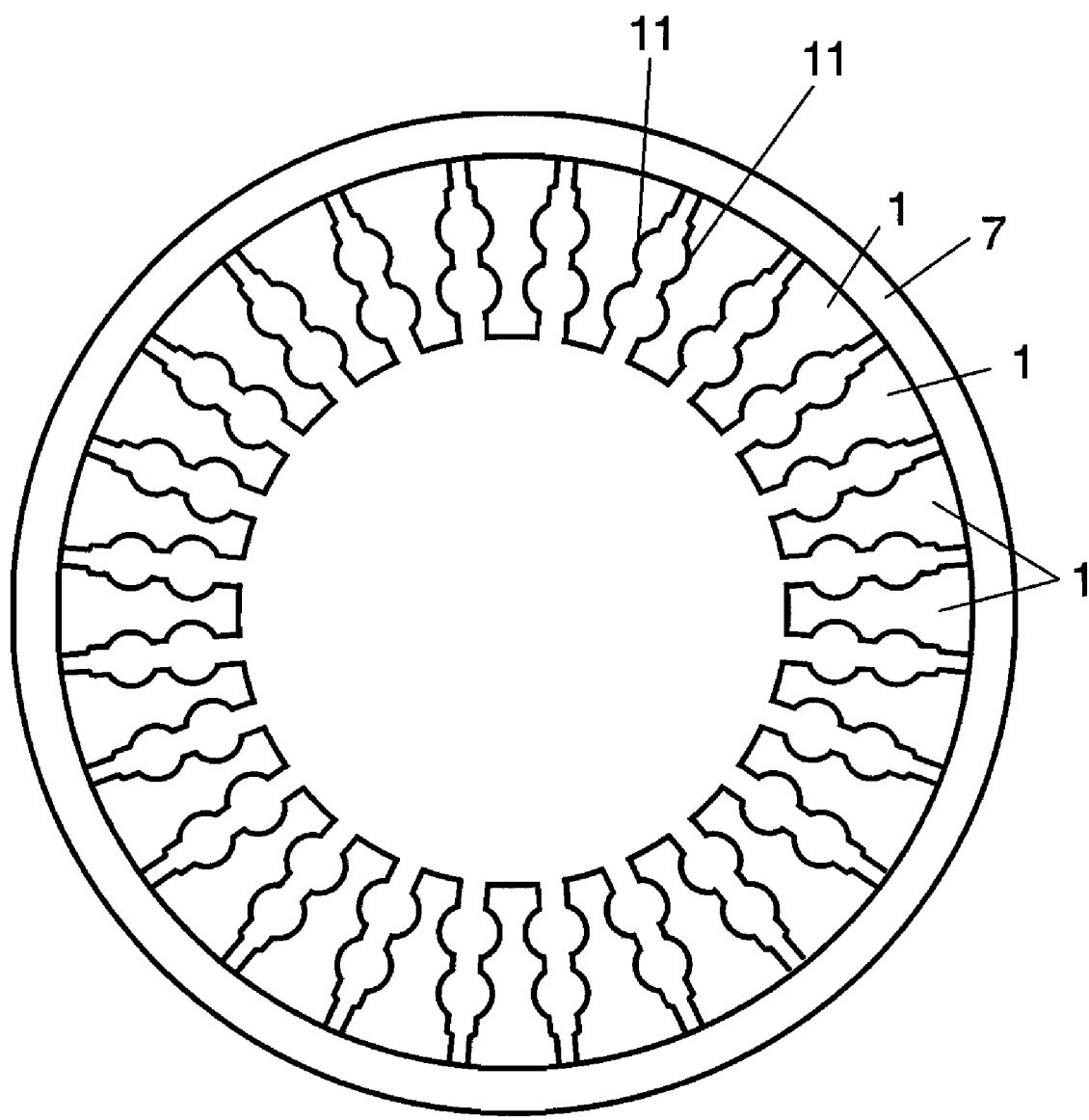
FIG. 5 is a plan view showing a state in the manufacturing method of the molded commutator of the exemplary embodiment.
Figure 6:
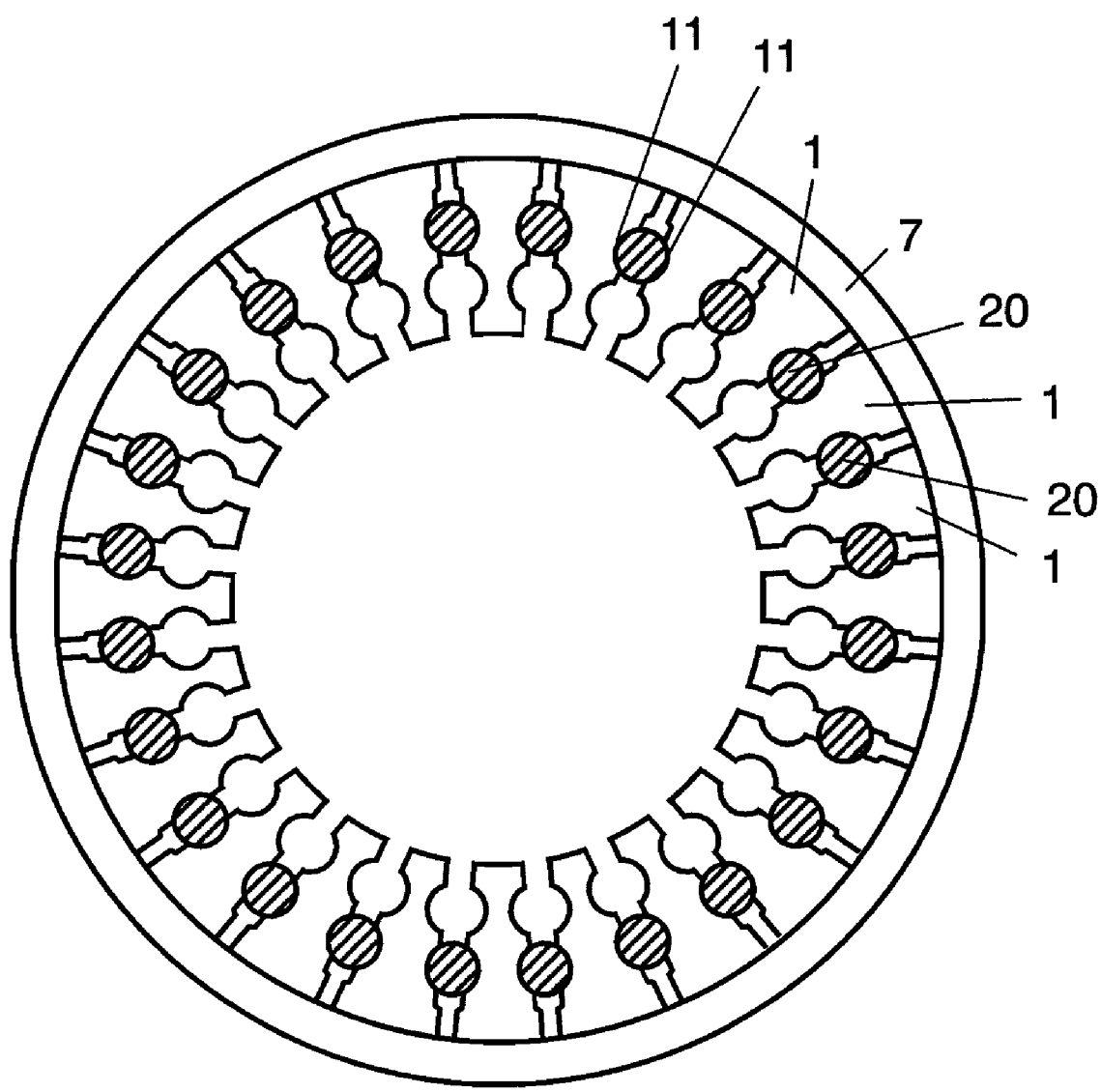
FIG. 6 is a plan view showing another state in the manufacturing method of the molded commutator of the exemplary embodiment.
Figure 7:
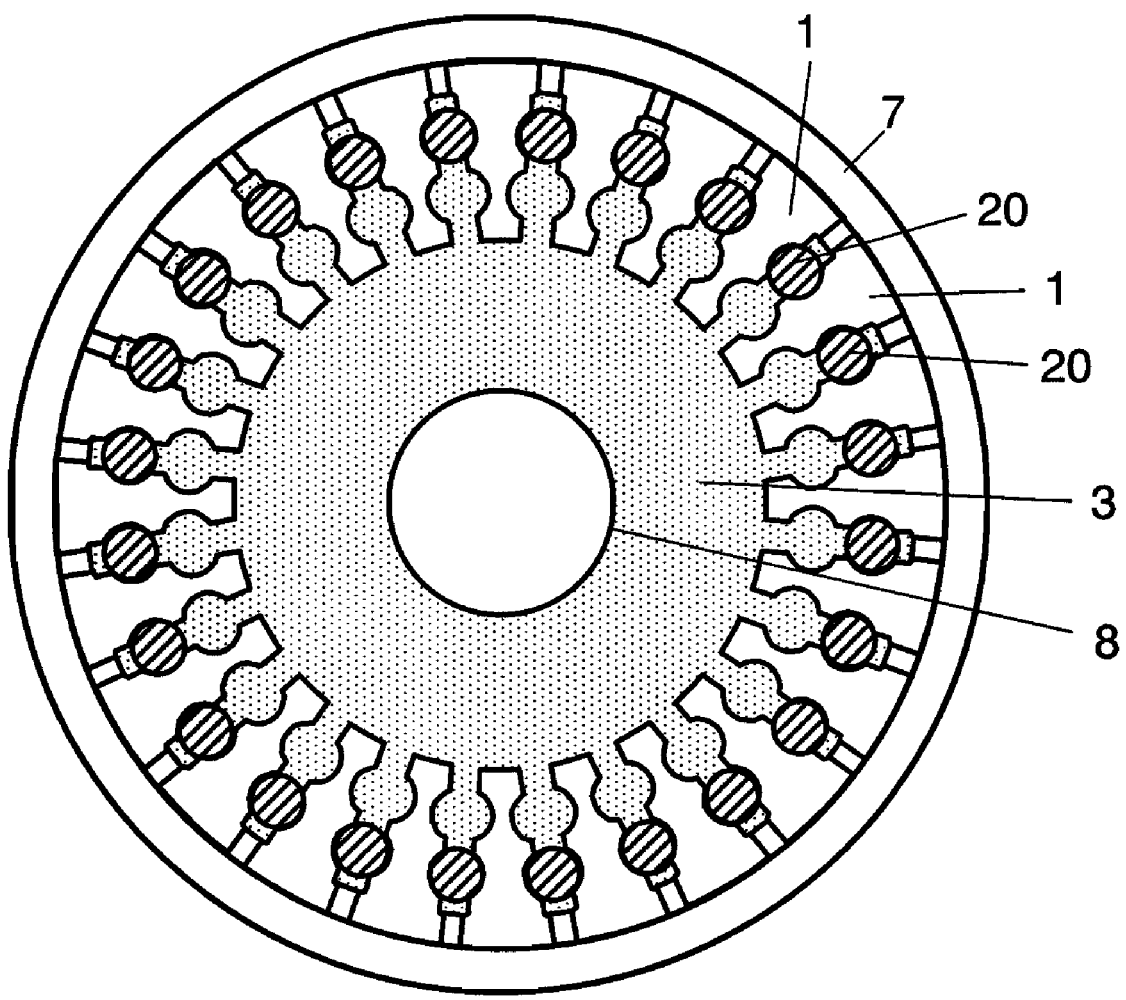
FIG. 7 is a plan view showing still another state in the manufacturing method of the molded commutator of the exemplary embodiment.

FIG. 4 is a flow chart showing the method of manufacturing the molded commutator of the exemplary embodiment. FIGS. 5 through 7 are plan views showing a state in the manufacturing method of the molded commutator of the exemplary embodiment.

<Step S1> (see FIG. 4 and FIG. 5)
arranging 24 commutator segments 1 along the inner periphery of cylindrical ring for molding 7.

<Step S2> (see FIG. 4 and FIG. 6)
press-fitting varistor pin 20 into each of grooves 11 formed between commutator segments 1 with a press-fitting load ranging from 2 kN to 5 kN. Application of the press-fitting load beyond the range above can cause problems; when a press-fitting load less than 2 kN is applied, molding material 3 remains between the commutator segments and the varistor pins, which causes an extremely high varistor-voltage at a section between the commutator segments; on the other hand, a load greater than 5 kN can cause breakage of the varistor pin.

<Step S3> (see FIG. 4 and FIG. 7)
injecting molding material 3 into commutator segments 1 and varistor pin press-fitted between the adjacent commutator segments so as to integrally mold them by resin molding. Prior to the injection, a ring (not shown) formed hole for rotation-shaft 8 is disposed concentric with ring for molding 7. Molding material 3 is applied outside the hole for rotation-shaft 8 toward the circumference of the ring for molding 7—at least so as not to cover the circumferentially outermost surfaces of commutator segments 1. Although a ring for forming hole for rotation-shaft 8 is employed here, it is not limited thereto; a hole for rotation-shaft 8 may be formed by stamping or cutting after the completion of resin molding of the entire structure.

After completion of a curing process of molding material 3, ring for molding 7 and the ring (not shown) for forming hole for rotation-shaft 8 are removed from the structure. The molded commutator shown FIG. 1 is thus completed.

According to the manufacturing method of the exemplary embodiment, commutator segments 1 make stable surface-contact with varistor pins 20. This keeps contact resistance between commutator segments 1 and varistor pins 20 at a low level. As a result, there is no need to have a step for electrically connecting between commutator segments 1 and varistor pins 20, thereby enhancing productivity.

Figure 8:
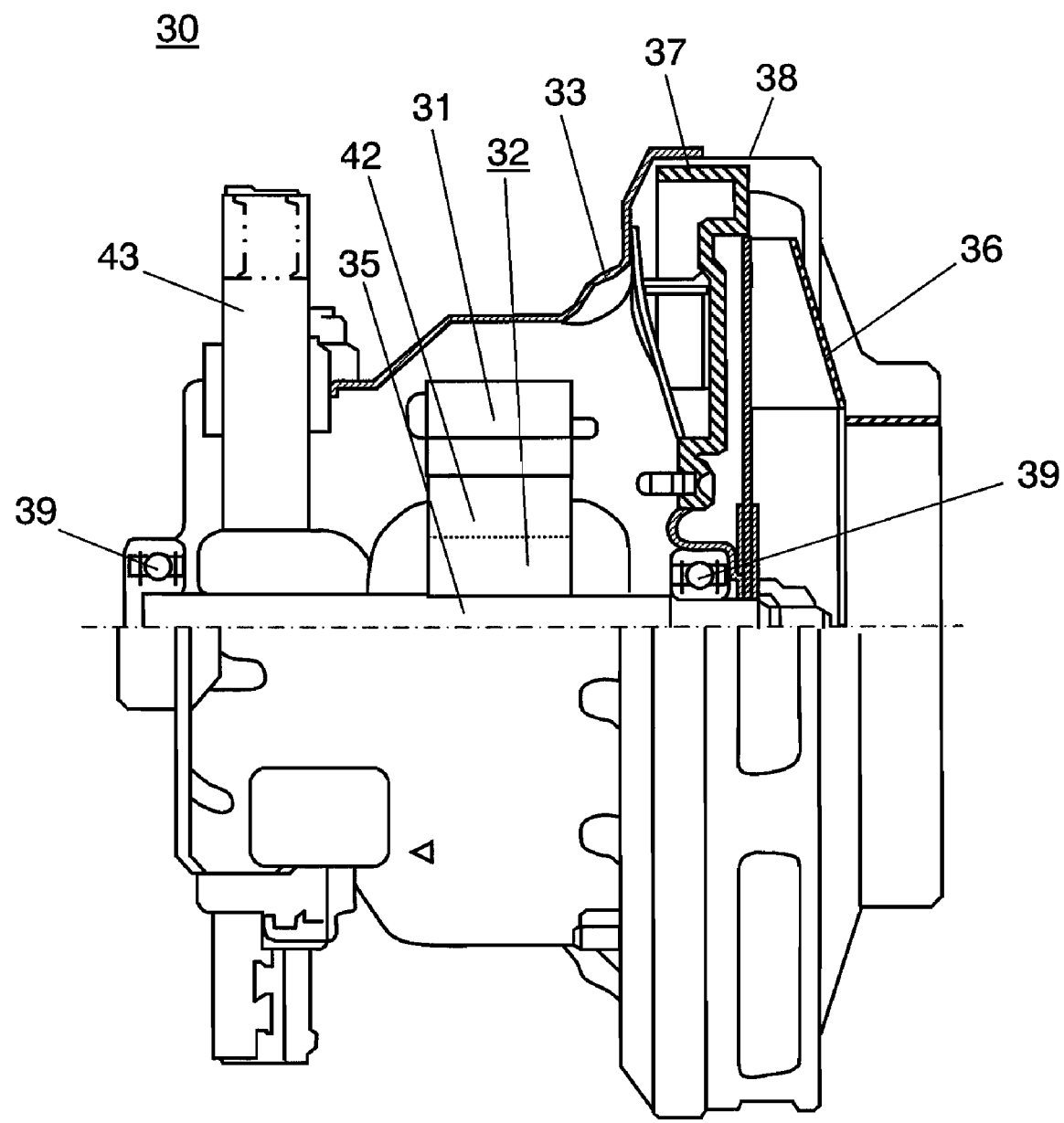
FIG. 8 is a vertical cross sectional view of a motor using the molded commutator of the exemplary embodiment of the present invention.

Now will be described a motor using the molded commutator structured by the method of the exemplary embodiment with reference to FIG. 8. FIG. 8 is a vertical cross sectional view of a motor using the molded commutator of the exemplary embodiment, and FIG. 9 is a side cross sectional view thereof.

Figure 9:
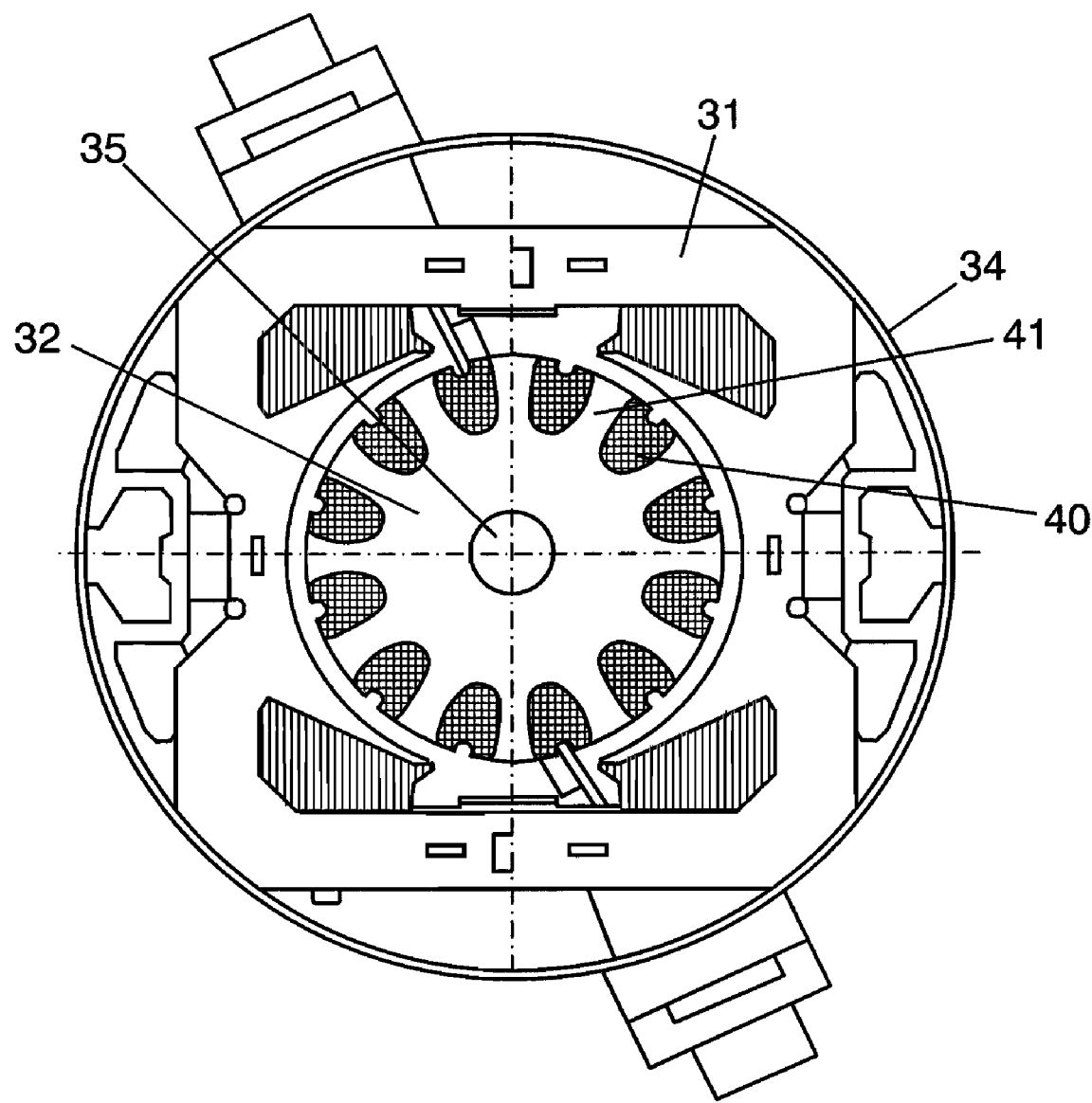
FIG. 9 is a side cross sectional view of the motor using the molded commutator of the exemplary embodiment of the present invention.

As shown in FIG. 8 and FIG. 9, motor 30 has stator (field magnet) 31 and rotor 32 that are oppositely located via an annular space. For example, rotor 32 has 22 slots 40, which are disposed parallel to an axial direction of output shaft 35, and has 22 teeth 41 between slots 40. Windings are provided between teeth 41. For example, molded commutator 42 having 22 commutator segments is fixed at an end of rotor 32. As rotor 32 rotates, molded commutator 42 rotates with sliding motion while making contact with a pair of brushes 43.

Motor 30 also has a pair of brackets 33, 34 to which stator (field magnet) 31 and rotor 32 are fixed. Output shaft 35 of rotor 32 is rotatably held at the top and the bottom by bearing 39. One end of output shaft 35 is extended outside motor 30 on the side of bracket 33 and is connected to rotary suction fan 36. Air guide 37 separates rotary suction fan 36 from stator 31 and rotor 32. Rotary suction fan 36 is covered with fan case 38 having a plurality of holes on the outer surface.

The structure above provides highly reliable motor 30 having a long operating life. The following are specific examples of the exemplary embodiment of the present invention.

First Embodied Example

The description of the first embodied example focuses on a relationship between the operating life of the brush and the material (surface condition) of a commutator segment and a varistor pin.

To make a comparative study of the surface condition, two commutator segment-samples made of copper alloy were prepared: one is a tin-plated commutator segment, and the other is an unplated commutator segment; similarly, two varistor pin-samples made of a zinc oxide-based material were prepared: one is a varistor pin having a silver electrode printed on the side making contact with the commutator segment, and the other is a varistor pin without the electrode. Such structured varistor pins, each of which has a different diameter for comparison, were press-fitted, with a press-fitting load of 2 kN, in the grooves between the commutator segments.

The inventor produced molded commutators of varying combinations of the commutator segments and the varistor pins described above.

In the first embodied example, the varistor voltage of each varistor pin was adjusted to 100V/mm (in thickness) by properly determining an average diameter of the zinc-oxide powder, the baking temperature and the baking period.

In determining an acceptable comparative sample, the inventor selected a sample in which the varistor voltage between the commutator segments after molding has a value close to the product of the varistor voltage of the varistor pin (i.e., 100V/mm in thickness) and the distance between the commutator segments. Employing the samples that satisfied the requirements above, the inventor produced 4 motors: sample 1 through sample 4.

In addition, the inventor prepared another motor as sample C1. Sample C1 has a molded commutator in which a ceramic pin made of aluminum oxide is press-fitted between the commutator segments, instead of a varistor pin.

With the use of motors structured above, the inventor carried out an evaluation test on the operating life of the motors. In the test, each motor was driven at 44000 r/min. with the application of 100V AC under no-load conditions.

Table 1 shows the various structural differences of samples 1 through 4 and sample C1 and the result of the evaluation test.

for sample 3. The comparison proved that employing a varistor pin having a silver electrode printed on the side making contact with the commutator segment contributed to a longer life of the brush.

Furthermore, the result of sample 2 exceeded that of sample 1: 800 h for sample 1, whereas 900 h for sample 2. The comparison proved that employing tin-plated commutator segments also contributed to a longer operating life of the brush.

Second Embodied Example

The description of the second embodied example focuses on a relationship between the press-fitting load and the operating life of the brush.

To carry out the test, the inventor prepared samples; the commutator segments were made of copper alloy and tin-plated, and the varistor pins were made of zinc oxide-based compound and had unprocessed surfaces (i.e., with no printed electrode).

TABLE 1

| | | Sample 1 | Sample 2 | Sample 3 | Sample 4 | Sample C1 |
|---|---|---|---|---|---|---|
| commutator segment | Material | copper alloy | copper alloy | copper alloy | copper alloy | copper alloy |
| | Plating | none | tin-plated | none | tin-plated | None |
| varistor pin | Material | zinc oxide-based compound (varistor) | zinc oxide-based compound (varistor) | zinc oxide-based compound (varistor) | zinc oxide-based compound (varistor) | aluminum-oxide |
| | Electrode | none | none | silver electrode | silver electrode | none |
| varistor voltage of varistor pin (V/mm) | current-flow of 1 mA | 100 | 100 | 100 | 100 | — |
| diameter of varistor pin (mm) | | 1.3 | 1.3 | 1.3 | 1.3 | 1.3 |
| distance between commutator segments (mm) | | 0.5 | 0.5 | 0.5 | 0.5 | 0.5 |
| press-fitting load (kN) | | 2 | 2 | 2 | 2 | 2 |
| voltage between commutator segments (V) | | 12 | 12 | 12 | 12 | 12 |
| varistor voltage between molded commutator segments (V) | current-flow of 1 mA | 50 | 50 | 50 | 50 | — |
| motor supplied voltage (V) | AC voltage | 100 | 100 | 100 | 100 | 100 |
| rotation number of motor (r/min) | | 44000 | 44000 | 44000 | 44000 | 44000 |
| operating-life of brush (h) | | 800 | 900 | 900 | 900 | 600 |

As is apparent from Table 1, the motors with molded commutators each of which has varistor pins of sample 1 through sample 4 greatly contributed to a long operating life of the brush, compared to the motor with the molded commutator of sample C1 having ceramic varistor pins.

Compared to the motor of sample C1, all the motors of sample 1 through sample 4 achieved a longer operating life of the brush: 600 h for sample C1, whereas 800 h for sample 1; and 900 h for samples 2 through 4.

In sample 1 through sample 4, the result of sample 3 exceeded that of sample 1: 800 h for sample 1, whereas 900 h Such structured varistor pins, each of which has a different diameter for comparison, were press-fitted in the grooves between the commutator segments. The press-fitting load applied to the varistor pin was changed in a range from 0.5 kN to 10 kN according to the diameter of each varistor pin as follows: 0.5 kN (press-fitting load) for 1.28 mm (varistor pin-diameter); 2 kN for 1.30 mm; 5 kN for 1.32 mm; 10 kN for 1.34 mm.

Under the conditions similar—except for above—to that in the first embodied example, the inventor produced the molded commutators of varying combinations of the commutator segments and the varistor pins. The motors of sample 5 through sample 8 were thus completed.

With the use of motors structured above, the inventor carried out an evaluation test on the operating life of the brush. Like in the test in the first embodied example, each motor was driven at 44000 r/min. with the application of 100V AC under no-load conditions.

Table 2 shows the various structural differences of samples 5 through 8 and the result of the evaluation test.

TABLE 2

|  |  | Sample 5 | Sample 6 | Sample 7 | Sample 8 |
|---|---|---|---|---|---|
| commutator segment | material | copper alloy | copper alloy | copper alloy | copper alloy |
|  | plating | tin-plated | tin-plated | tin-plated | tin-plated |
| varistor pin | material | zinc oxide-based compound (varistor) | zinc oxide-based compound (varistor) | zinc oxide-based compound (varistor) | zinc oxide based compound (varistor) |
|  | electrode | none | none | none | none |
| varistor voltage of varistor pin (V/mm) | current-flow of 1 mA | 100 | 100 | 100 | 100 |
| diameter of varistor pin (mm) |  | 1.28 | 1.30 | 1.32 | 1.34 |
| distance between commutator segments (mm) |  | 0.5 | 0.5 | 0.5 | 0.5 |
| press-fitting load (kN) |  | 0.5 | 2.0 | 5.0 | 10.0 |
| voltage between commutator segments (V) |  | 12 | 12 | 12 | 12 |
| varistor voltage between molded commutator segments (V) | current-flow of 1 mA | 1800 or greater at some sections | 50 | 50 | 1800 or greater at some sections |
| motor supplied voltage (V) | AC voltage | 100 | 100 | 100 | 100 |
| rotation number of motor (r/min) |  | 44000 | 44000 | 44000 | 44000 |
| operating-life of brush (h) |  | — | 900 | 900 | — |

As is shown in Table, 2, sample 5 undergoes a press-fitting load of 0.5 kN (i.e., less than 2 kN). As for sample 5, the test result of the operating life of the brush could not obtained because of the fact—molding material 3 remained between the commutator segments and the varistor pins due to the poor load, which caused an extremely high varistor voltage at a section between the molded commutator segments.

Sample 8 undergoes a press-fitting load of 10 kN (i.e., greater than 5 kN). The test result could not obtained because of the fact—the varistor pin broke during the press-fitting process due to the excessive load, which caused an extremely high varistor voltage at a section between the molded commutator segments.

Sample 6 and sample 7 undergo a press-fitting load ranging from 2 kN to 5 kN. Unlike the two samples in failure, they achieved stable varistor voltage between the commutator segments and the varistor pins. The test result proved that the application of a press-fitting load ranging from 2 kN to 5 kN contributed to a longer life of the brush.

Third Embodied Example

The description of the third embodied example focuses on a relationship between varistor voltage of a varistor pin and the operating life of the brush.

To carry out the test, the inventor prepared samples; the commutator segments were made of copper alloy and tin-plated, and the varistor pins were made of zinc oxide-based compound and had unprocessed surfaces (i.e., with no printed electrode).

The varistor pins above, each of which has a diameter of 1.3 mm, were press-fitted, with a press-fitting load of 2 kN, in the grooves between the commutator segments.

In the third embodied example, the varistor voltage of each varistor pin was adjusted to 50V/mm (in thickness), 100V/mm, 120V/mm and 240V/mm by properly determining an average diameter of the zinc-oxide powder, the baking temperature and the baking period.

Using the commutator segments and the varistor pins above, the inventor produced the molded commutators so as to have a varistor voltage about two-times- and four-times-greater than the voltage between the commutator segments of 12V and 28V. Specifically, as for each voltage of 12V and 28V, two combinations were prepared: the molded commutator having a varistor voltage between the molded commutator segments of 25V (approx. 12V×2); the molded commutator having a varistor voltage of 50V (approx. 12V×4); the molded commutator having a varistor voltage of 60V (approx. 28V×2); and the molded commutator having a varistor voltage of 120V (approx. 28V×4).

Under the conditions similar—except for above—to that in the first embodied example, the inventor produced 4 motors: sample 9 through sample 12.

With the use of motors structured above, the inventor carried out an evaluation test on the operating life of the brush. In the third embodied example, each motor was driven at 44000 r/min. and 38000 r/min. with the application of 100V AC and 240V AC under no-load conditions.

Table 3 shows the various structural differences of samples 9 through 12 and the result of the evaluation test.

TABLE 3

|  |  | Sample 9 | Sample 10 | Sample 11 | Sample 12 |
|---|---|---|---|---|---|
| commutator segment | material plating | copper alloy tin-plated | copper alloy tin-plated | copper alloy tin-plated | copper alloy tin-plated |
| varistor pin | material | zinc oxide-based compound (varistor) | zinc oxide-based compound (varistor) | zinc oxide-based compound (varistor) | zinc oxide-based compound (varistor) |
|  | electrode | none | none | none | none |
| varistor voltage of varistor pin (V/mm) | current-flow of 1 mA | 50 | 100 | 120 | 240 |
| diameter of varistor pin (mm) |  | 1.3 | 1.3 | 1.3 | 1.3 |
| distance between commutator segments (mm) |  | 0.5 | 0.5 | 0.5 | 0.5 |
| press-fitting load (kN) |  | 2 | 2 | 2 | 2 |
| voltage between commutator segments (V) |  | 12 | 12 | 28 | 28 |
| varistor voltage between molded commutator segments (V) | current-flow of 1 mA | 25 | 50 | 60 | 120 |
| motor supplied voltage (V) | AC voltage | 100 | 100 | 240 | 240 |
| rotation number of motor (r/min) |  | 44000 | 44000 | 44000 | 44000 |
| operating-life of brush (h) |  | 950 | 900 | 950 | 900 |

According to Table 3, sample 9 and sample 11 slightly extended the operating life of the brush relative to sample 10 and sample 12. That is, the result of the commutator segments with two-times-high varistor-voltage exceeded that of the commutator with four-times-high varistor-voltage. From the result above, the inventor reached a conclusion; controlling the varistor voltage between the molded commutator segments so as to approximate the voltage between the commutator segments enhances an effect of suppressing spark voltage caused by the varistor pins and spark current, which contributes to a long life of the brush.

As is shown in the test result above, it is obvious that the molded commutator of the present invention is far superior to conventional ones in extending the life of the brush. This advantage significantly increases the operating life of the motor.

Although the exemplary embodiment introduces a molded commutator having 24 commutator segments 1 and 24 varistor pins 20, it is not limited thereto. A similar effect is expected by employing a molded commutator with a greater or lesser number of commutator segments 1 and varistor pins 20.

Although the commutator segment described in the exemplary embodiment is made of copper alloy having approx. 0.05%, by weight, of silver to electrolytic copper with high conductivity, it is not limited thereto. For example, the molded commutator can be made of pure copper with high conductivity or can be made of copper alloy containing a different amount of a metal other than silver.

Although the commutator segment described in the exemplary embodiment has a tin-plated surface that makes contact with the varistor pin, it is not limited thereto. The surface can be coated with other metals such as nickel, silver and gold. Besides, although the varistor pin has a silver-printed surface that makes contact with commutator segments 1, the surface can be coated with tin, nickel and gold by printing or plating. In that case, contact resistance between the commutator segments and the varistor pins can be further decreased.

Although each of the varistor pins has a cylindrical shape in the exemplary embodiment, it is not necessarily cylindrical as long as the varistor pin fits snugly with the shape of the groove between the commutator segments.

The molded commutator of the present invention is eminently suitable for a motor that is employed for a cleaner and a power tool.

The invention claimed is:

1. A method of manufacturing a molded commutator for a vacuum cleaner motor, the molded commutator having a plurality of commutator segments arranged in a circle, and grooves respectively formed between adjacent pairs of said commutator segments in a rotating direction, such that the grooves are extended orthogonal to the rotating direction; a plurality of cylindrical varistors respectively fitted in said grooves formed between the adjacent commutator segments; and a molding material molding the commutator segments and the cylindrical varistors together to maintain integral engagement of the commutator segments and the cylindrical varistors;

wherein the commutator segments are made of copper alloy containing silver, wherein the cylindrical varistors are formed of zinc oxide compounds and have a density ranging from 5 $g/cm^3$ to 5.5 $g/cm^3$;

wherein at least side surfaces of said cylindrical varistors make contact with the respective adjacent pairs of commutator segments; and wherein flexible metal is printed on said side surfaces of said cylindrical varistors that make contact with the respective adjacent pairs of commutator segments, the method comprising:

providing a cylindrical molding ring;

arranging a plurality of the commutator segments in a circle along an inner periphery of the cylindrical molding ring;

press-fitting the cylindrical varistors between the commutator segments arranged in the circle along the inner periphery of the cylindrical molding ring, with a press-fitting load for each of the cylindrical varistors ranging from 2 kN to 5 kN inclusive; and resin-molding the commutator segments and the cylindrical varistors together with a molding material so as to maintain integral engagement of the commutator segments and the cylindrical varistors.

2. The method of claim 1, further comprising after said resin-molding of the commutator segments and the cylindrical varistors together with the molding material, removing the cylindrical molding ring from the commutator segments and the cylindrical varistors molded together with the molding material.

3. The method of claim 2, wherein said resin-molding of the commutator segments and the cylindrical varistors together with the molding material comprises, after said arranging of the commutator segments in the circle along the inner periphery of the cylindrical molding ring, injecting the molding material into between pairs of the commutator segments with the cylindrical varistors respectively press-fitted therebetween.

4. The method of claim 3, wherein in said injecting of the molding material into between the pairs of the commutator segments with the cylindrical varistors respectively press-fitted therebetween, said injecting is carried out so as not to cover circumferentially outermost surfaces of the commutator segments.

5. The method of claim 1, wherein said resin-molding of the commutator segments and the cylindrical varistors together with the molding material comprises, after said arranging of the commutator segments in the circle along the inner periphery of the cylindrical molding ring, injecting the molding material into between pairs of the commutator segments with the cylindrical varistors respectively press-fitted therebetween.

6. The method of claim 5, wherein in said injecting of the molding material into between the pairs of the commutator segments with the cylindrical varistors respectively press-fitted therebetween, said injecting is carried out so as not to cover circumferentially outermost surfaces of the commutator segments.

* * * * *